US012139315B2

(12) United States Patent
Deeb

(10) Patent No.: US 12,139,315 B2
(45) Date of Patent: Nov. 12, 2024

(54) PICKLING DEVICE WITH PRESSURED CAVITY AND RELATED METHODS

(71) Applicant: Michael J. Deeb, Saint Petersburg, FL (US)

(72) Inventor: Michael J. Deeb, Saint Petersburg, FL (US)

( * ) Notice: Subject to any disclaimer, the term of this patent is extended or adjusted under 35 U.S.C. 154(b) by 0 days.

(21) Appl. No.: 18/160,357

(22) Filed: Jan. 27, 2023

(65) Prior Publication Data

US 2023/0174279 A1 Jun. 8, 2023

Related U.S. Application Data

(63) Continuation of application No. 16/458,617, filed on Jul. 1, 2019, now Pat. No. 11,584,572.

(51) Int. Cl.
*B65D 51/16* (2006.01)
*A23L 3/3454* (2006.01)
(Continued)

(52) U.S. Cl.
CPC ........ *B65D 51/1683* (2013.01); *A23L 3/3454* (2013.01); *A23L 19/20* (2016.08);
(Continued)

(58) Field of Classification Search
CPC ...... B65D 41/045; B65D 51/14; B65D 53/04; B65D 83/04; B65D 85/58; B65D 39/025;
(Continued)

(56) References Cited

U.S. PATENT DOCUMENTS 4,785,727 A * 11/1988 Miyata ..................... A23B 7/10 366/233
4,785,728 A * 11/1988 Miyata ..................... A23B 7/10 366/233
(Continued)

FOREIGN PATENT DOCUMENTS

CN 86106454 4/1988
CN 2092212 U 1/1992
(Continued)

OTHER PUBLICATIONS

Donna Currie "Cookistry: Quick Pickled Vegetables in your Instant Pot (or other electric pressure cooker)" https://www.cookistry.com/2018/01/quick-pickled-vegetables-in-your.html; Jan. 23, 2018; p. 3.
* *See U.S. Appl. No. 16/458,617.

*Primary Examiner* — Kareen K Thomas
(74) *Attorney, Agent, or Firm* — Allen, Dyer, Doppelt + Gilchrist, PA

(57) ABSTRACT

A method is for using a pickling device. The method includes positioning food to be pickled in a pickling cavity of a housing. The housing has a first open end and a second closed end opposite the first open end, and the pickling cavity extends between the first open end and the second closed end. The method also includes positioning a disc-shaped insert in the pickling cavity and over the food to be pickled, coupling a lid to the first open end of the housing, and coupling a positive pressure source, external to the housing, to the lid. The method further includes operating the positive pressure source to pressurize the pickling cavity to exceed a threshold pressure level during a pickling process without application of heat.

20 Claims, 5 Drawing Sheets

10 21 22 20 15 17 23 24 14 16 26 25a-25n 12 11 18 13

(51) Int. Cl.
*A23L 19/20* (2016.01)
*B65D 25/02* (2006.01)
*B65D 43/02* (2006.01)

(52) U.S. Cl.
CPC ......... *B65D 25/02* (2013.01); *B65D 43/0222* (2013.01); *A23V 2002/00* (2013.01)

(58) Field of Classification Search
CPC .... B65D 39/02; B65D 23/04; B65D 51/1683; B65D 25/02; B65D 43/0222; A23L 3/3454; A23L 19/20; A23L 19/03; A23V 2002/00; A23B 7/10; A23P 30/00
See application file for complete search history.

(56) References Cited

U.S. PATENT DOCUMENTS 6,110,513 A 8/2000 Hackl et al.
6,242,025 B1 6/2001 Lesky et al.
6,340,028 B1 * 1/2002 Hirai ...................... C23G 3/021 134/122 R
7,670,042 B2 3/2010 Cheung
2009/0230154 A1 * 9/2009 Dyer ...................... B65D 23/04 222/386
2010/0089252 A1 4/2010 Hong
2013/0011536 A1 * 1/2013 Weiss ..................... A47G 19/30 426/321
2013/0299442 A1 * 11/2013 Aralp ..................... B65D 25/08 215/6
2014/0116271 A1 5/2014 Diggs et al.
2015/0158657 A1 * 6/2015 Olson ................... A47J 41/028 220/592.27
2017/0327284 A1 * 11/2017 Klein ....................... A23B 7/10
2018/0370705 A1 * 12/2018 Farstad ................ B65D 75/326

FOREIGN PATENT DOCUMENTS

| | | |
|---|---|---|
| CN | 2343802 | 10/1999 |
| CN | 104256848 | 1/2015 |
| CN | 104939005 | 9/2015 |
| CN | 206933299 | 1/2018 |
| WO | WO2006001677 | 1/2006 |

* cited by examiner

PICKLING DEVICE WITH PRESSURED CAVITY AND RELATED METHODS

RELATED APPLICATION

This application is a continuation of application Ser. No. 16/458,617 filed Jul. 1, 2019, now U.S. Pat. No. 11,584,572, the subject matter of this application is incorporated herein by reference in its entirety.

TECHNICAL FIELD

The present disclosure relates to the field of kitchen appliances, and, more particularly, to a pickling device and related methods.

BACKGROUND

Pickling is the process of preserving or extending the lifespan of food by either anaerobic fermentation in brine or immersion in vinegar (i.e. pickling fluid). The pickling procedure typically affects the food's texture, taste and flavor. The resulting food is called a pickle, or, to prevent ambiguity, prefaced with pickled. Foods that are pickled include vegetables, fruits, meats, fish, dairy, and eggs.

Typically, the food to be pickled is sealed in an air tight container with the pickling fluid for a lengthy period of time, for example, several weeks. Because of this, there has been a desire for a "quick pickling" process using accelerants, such as heat and pressure.

SUMMARY

Generally, a method is for using a pickling device. The method comprises positioning food to be pickled in a pickling cavity of a housing. The housing has a first open end and a second closed end opposite the first open end, and the pickling cavity extends between the first open end and the second closed end. The method also includes positioning a disc-shaped insert in the pickling cavity and over the food to be pickled, coupling a lid to the first open end of the housing, and coupling a positive pressure source, external to the housing, to the lid. The method further comprises operating the positive pressure source to pressurize the pickling cavity to exceed a threshold pressure level during a pickling process without application of heat.

In some embodiments, the method may comprise operating an air valve in the lid to provide selective fluid coupling to the pickling cavity. The positive pressure source may comprise a hand air pump to be removably coupled to the air valve.

In particular, the lid may comprise a plurality of tabs at a periphery of the lid, and the housing may define a plurality of recesses at the first open end and to cooperate with the plurality of tabs to couple the lid to the housing. The lid may comprise a sealing member extending around a periphery of the lid.

The method may further comprise operating a safety valve in the lid to release pressure in the pickling cavity when a cavity pressure exceeds an upper pressure threshold. The disc-shaped insert may define a plurality of openings therein. Each opening in the plurality of openings may be circle-shaped, for example. The method may also comprise positioning a liner, for example, a stainless steel liner, in the pickling cavity. In some embodiments, the method may further comprise operating the positive pressure source based upon a motorized power source.

Another aspect is directed to a method for operating a pickling device. The pickling device comprises a housing having a first open end and a second closed end opposite the first open end. The housing defines a pickling cavity extending between the first open end and the second closed end, and the pickling cavity is to receive food to be pickled. The pickling device comprises a disc-shaped insert to be positioned in the pickling cavity and over the food to be pickled, and a lid to be coupled to the first open end of the housing. The method comprises operating a positive pressure source, external to the housing and to be removably coupled to the lid, to pressurize the pickling cavity to exceed a threshold pressure level during a pickling process without application of heat.

DETAILED DESCRIPTION

Figure 1:
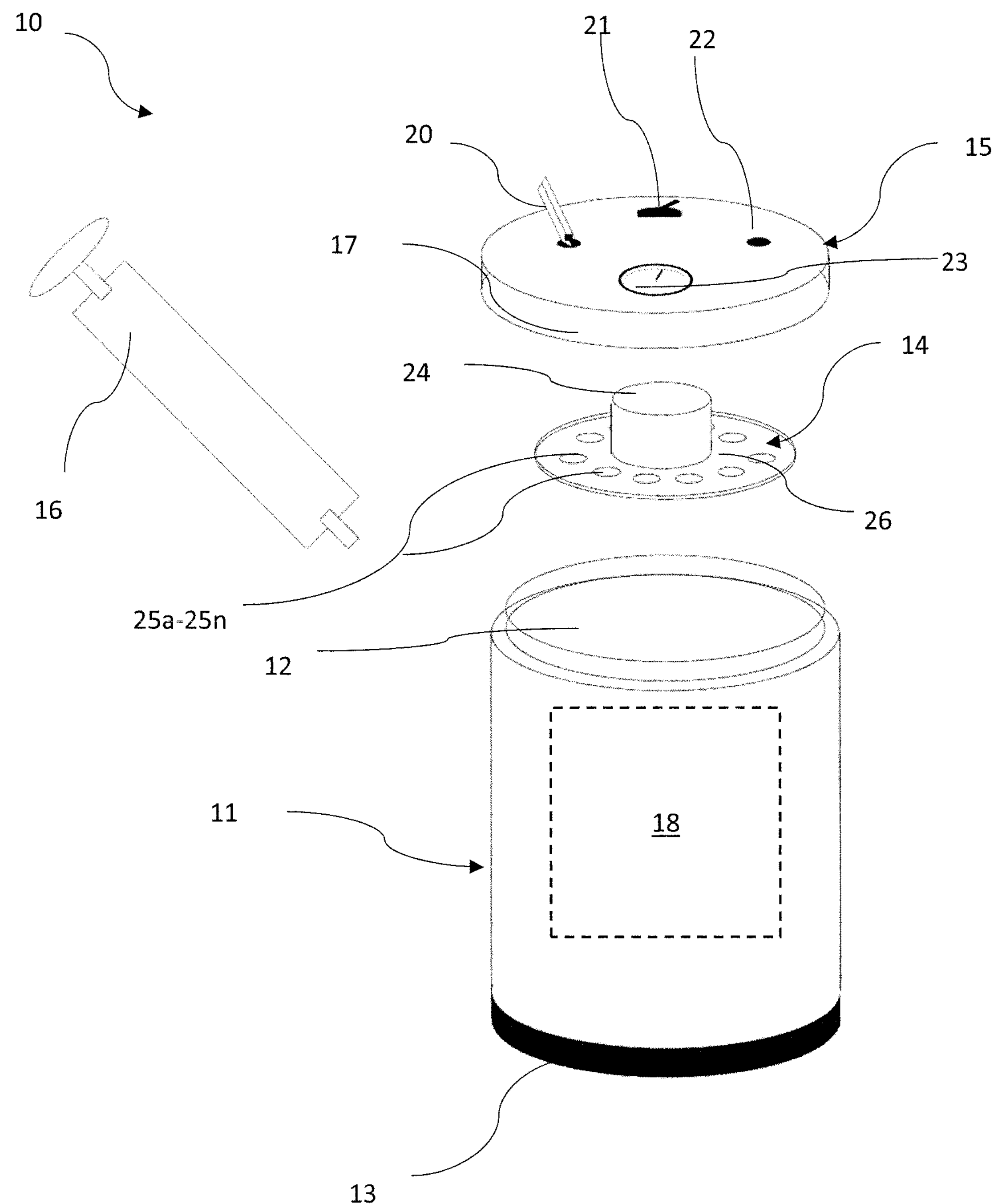
FIG. 1 is a schematic diagram of a first embodiment of a pickling device, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, a pickling device 10 (or food processing device) according to the present disclosure is now described. The pickling device 10 illustratively comprises a housing 11 having a first open end 12 and a second closed end 13 opposite the first open end. The housing 11 defines a pickling cavity 18 (or food processing cavity) extending between the first open end 12 and the second closed end 13, and the pickling cavity is to receive food to be pickled (or processed).

For example, the food to be pickled may comprise cucumbers, peppers, onion, cauliflower, carrots, beanstalk, turnips, beets, green tomato, watermelon rind, and meats. Of course, this list is merely exemplary and other foods, vegetables, fruits and meats could be pickled. In some embodiments, the pickling device 10 may serve as a food processing device. The food processing device may be used for cold soaking or marinating foods. For example, the foods may comprise dried beans, dried pasta, dried rice, dried wheat, dried grits, and dried oats.

The housing 11 may comprise an external housing, and a rigid container carried therein. The external housing may comprise any lightweight material, such as a polymer plastic material, stainless steel, or aluminum. As will be appreciated, the rigid container sets the boundaries of the pickling cavity 18, and must possess a threshold material strength to withstand a pickling process described herein.

It should be appreciated that the pickling device 10 is advantageous for a kitchen countertop application, and would need to be readily moved and installed (i.e. comprising a portable housing). Of course, in other embodiments, the pickling device 10 could be used in commercial applications with a larger capacity, and may be perhaps be fixed or immovable in some embodiments.

The pickling device 10 illustratively includes a disc-shaped insert 14 to be positioned in the pickling cavity 18 and over the food to be pickled. The disc-shaped insert 14 illustratively comprises a circle-shaped disc 26 defining a plurality of openings 25*a*-25*n* therein, and a cylinder-shaped post 24 coupled to a medial portion of the circle-shaped disc. Each opening in the plurality of openings 25*a*-25*n* is circle-shaped, but in other embodiments, other shapes could be used, such an oval-shaped openings, or rectangle-shaped openings.

Helpfully, the disc-shaped insert 14 is configured to maintain the food to be pickled in the bottom portion of the pickling cavity 18. The disc-shaped insert 14 is to weigh down the food to be pickled so that it doesn't float at the surface of the pickling liquid, exposing in part to air. In other words, the disc-shaped insert 14 is designed to completely submerge the food.

The pickling device 10 illustratively includes a lid 15 to be coupled to the first open end 12 of the housing 11. The lid 15 illustratively is circle-shaped and includes an air valve 20 to provide selective fluid coupling to the pickling cavity 18 (i.e. coupling the ambient air to the pickling cavity).

The pickling device 10 illustratively includes a positive pressure source 16 to be removably coupled to the air valve 20 of the lid 15 and configured to pressurize the pickling cavity 18 to a threshold pressure level of 15-25 pounds/$in^2$ during the pickling process without application of heat. As shown in the illustrated embodiment, the positive pressure source 16 includes a hand air pump to be removably coupled to the air valve 20. Of course, in other embodiments, the positive pressure source 16 may comprise a motorized pressure source.

The lid 15 illustratively comprises a sealing member 17 extending around a periphery of the lid. As will be appreciated, the sealing member 17 is configured to ensure a hermetic or airtight seal between the lid 15 and the housing 11. The lid 15 illustratively comprises a safety valve 22 configured to automatically release pressure in the pickling cavity 18 when a cavity pressure value exceeds an upper pressure. For example, the threshold may comprise a percentage of a maximum safety pressure limit for the rigid container of the housing 11. In other words, this safety valve 22 is configured to avoid destruction of the housing 11 due to over pressurization.

The lid 15 illustratively includes a user-activated valve 21 configured to permit the user to release the pressure within the pickling cavity 18 when the pickling process is complete. In this illustrated embodiment, the user-activated valve 21 includes a lever for activation. Of course, in other embodiments, the mechanical actuation of the user-activated valve 21 could be different, such as a push button, or even replaced with a digital actuation. The lid 15 illustratively includes a pressure gauge 23 configured to provide a current pressure value for the pickling cavity 18.

In some powered embodiments, the lid 15 may comprise a wireless transceiver for remote control of the user-activated valve 21, which would be electrically toggled. Indeed, the pickling device 10 may be operated as an Internet of Things (IoT) device, and would be controlled via a remote web interface of via a mobile application on a mobile device.

In some embodiments, the pickling device 10 may include a timer configured to determine when the pickling process has been completed (i.e. pickling time period has expired), and to generate an indication (e.g. audio indication or electronic indication in IoT embodiments) when the pickling process is complete. In unpowered embodiments, the timer may include a mechanical timer (e.g. gear and spring driven timer) and buzzer. In some embodiments, the user-activated valve 21 could be automatically actuated when the pickling process is complete.

As will be appreciated, the pickling cavity 18 would hold a pickling fluid, such as vinegar, with the food to be pickled. In food processing device embodiments, the food processing cavity would hold a food processing fluid, such as a marinade or water, with the food to be processed.

Advantageously, the pickling device 10 may pickle food in less time than existing approaches. Moreover, the pickling device 10 is unpowered in many embodiments, and does not use heat for a pickling accelerant during the pickling process, which can affect the end product. Moreover, the lack of the thermal energy accelerant reduces the operating/energy cost of the pickling device 10, which can be critical in commercial applications.

Figure 2:
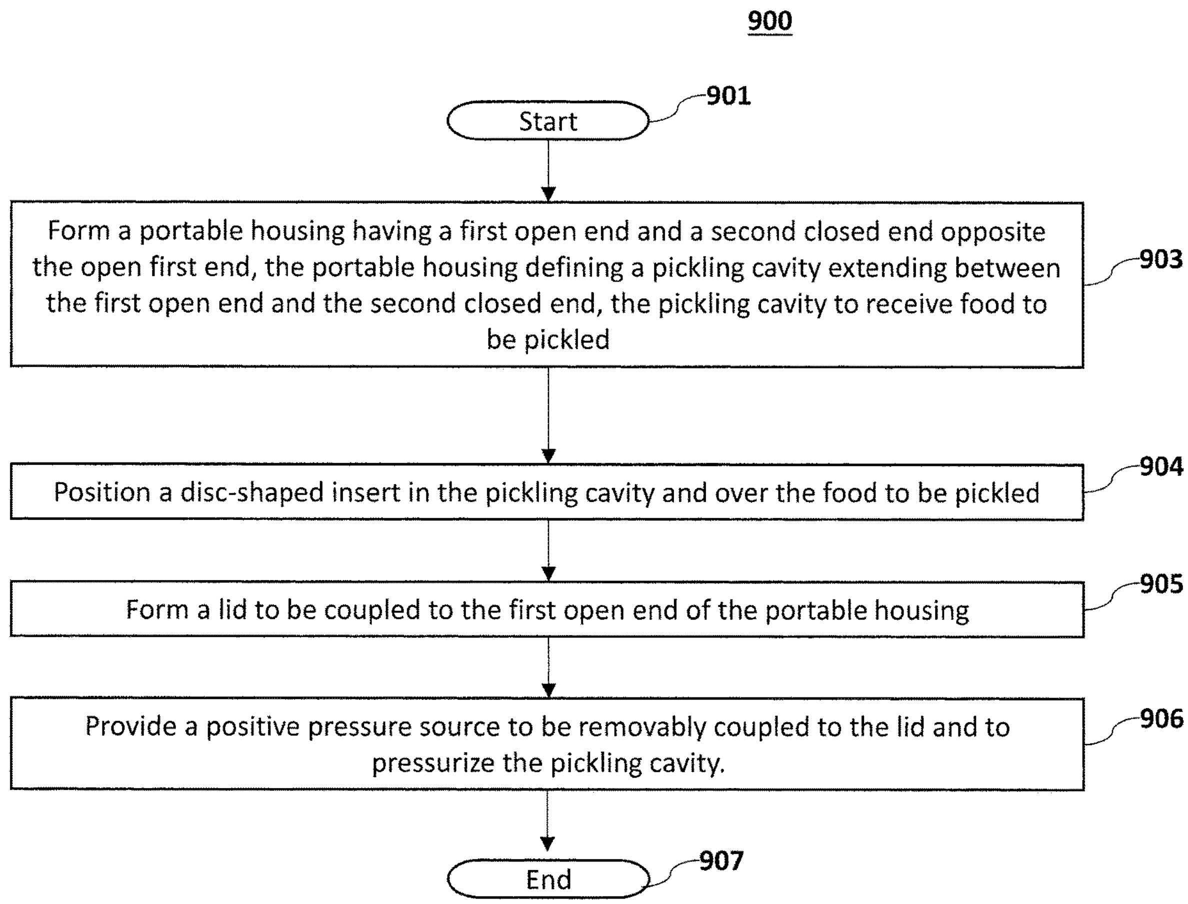
FIG. 2 is a flowchart of a method for making the pickling device, according to the present disclosure.

Referring now additionally to FIG. 2, another aspect directed to a method for making a pickling device 10 is described with reference to a flowchart 900. (Block 901). The method illustratively comprises forming a housing 11 having a first open end 12 and a second closed end 13 opposite the first open end. (Block 903). The housing 11 defines a pickling cavity 18 extending between the first open end 12 and the second closed end 13, and the pickling cavity 18 is to receive food to be pickled. The method illustratively includes positioning a disc-shaped insert 14 in the pickling cavity 18 and over the food to be pickled, forming a lid 15 to be coupled to the first open end 12 of the housing b11, and providing a positive pressure source 16 to be removably coupled to the lid and to pressurize the pickling cavity 18. (Blocks 904-907).

Figure 3:
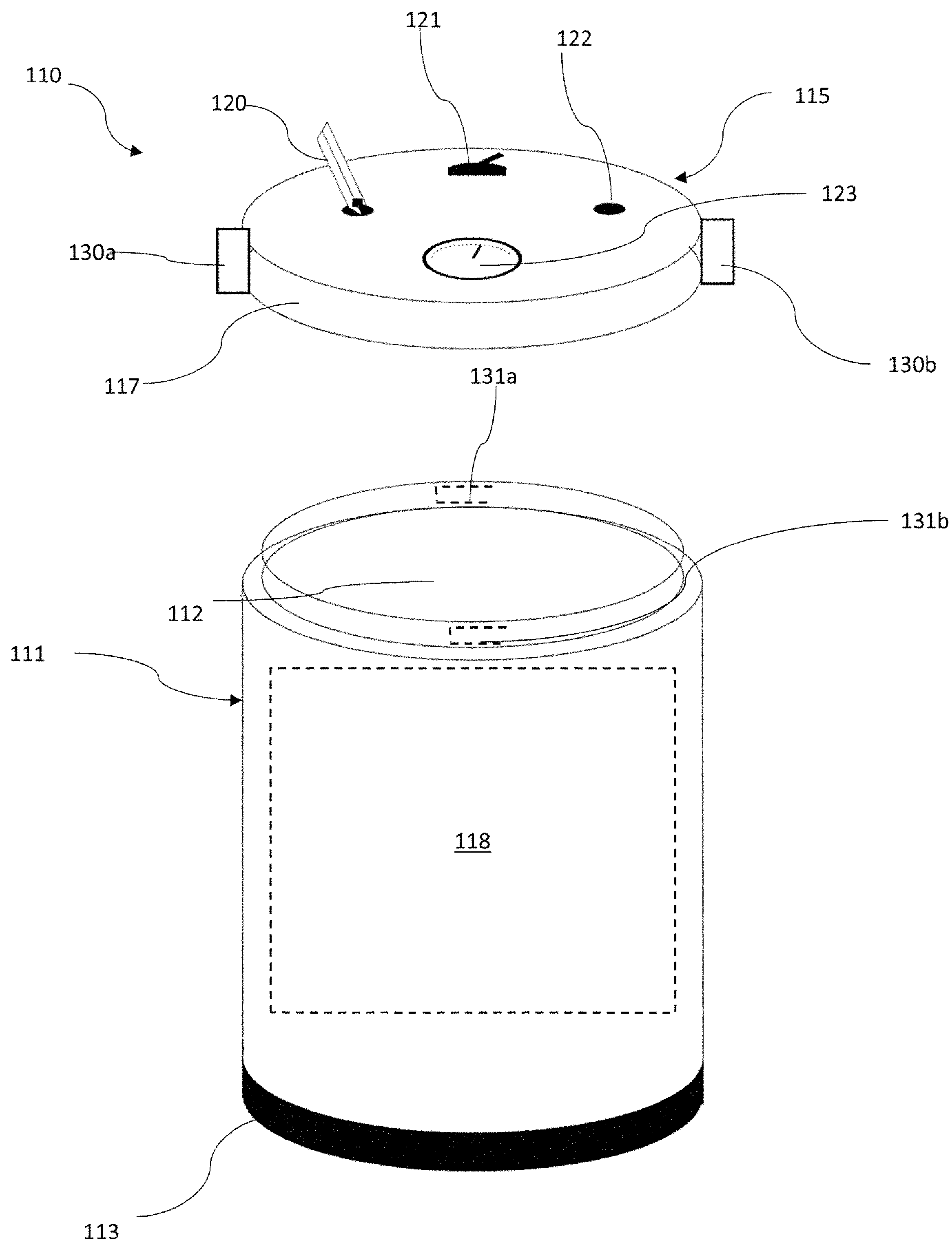
FIG. 3 is a schematic diagram of a second embodiment of the pickling device, according to the present disclosure.

Referring now additionally to FIG. 3, another embodiment of the pickling device 110 is now described. In this embodiment of the pickling device 110, those elements already discussed above with respect to FIGS. 1-2 are incremented by 100 and most require no further discussion herein. This embodiment differs from the previous embodiment in that this pickling device 110 illustratively includes a plurality of tabs 130*a*-130*b* at a periphery of the lid 115. The housing 111 defines a plurality of recesses 131*a*-131*b* at the first open end 112 and to cooperate with the plurality of tabs 130*a*-130*b* to couple the lid 115 to the housing. Helpfully, this interlocking mechanism will provide for a secure tight lock, even when the pickling cavity 18 is pressurized.

In other embodiments, the interlocking mechanism could be replaced with a threading engagement mechanism. In particular, the periphery of the lid 115 includes a first threaded surface, and the upper radial interior wall of the first open end 112 would include a second threaded surface for engaging the first threaded surface.

Figure 4:
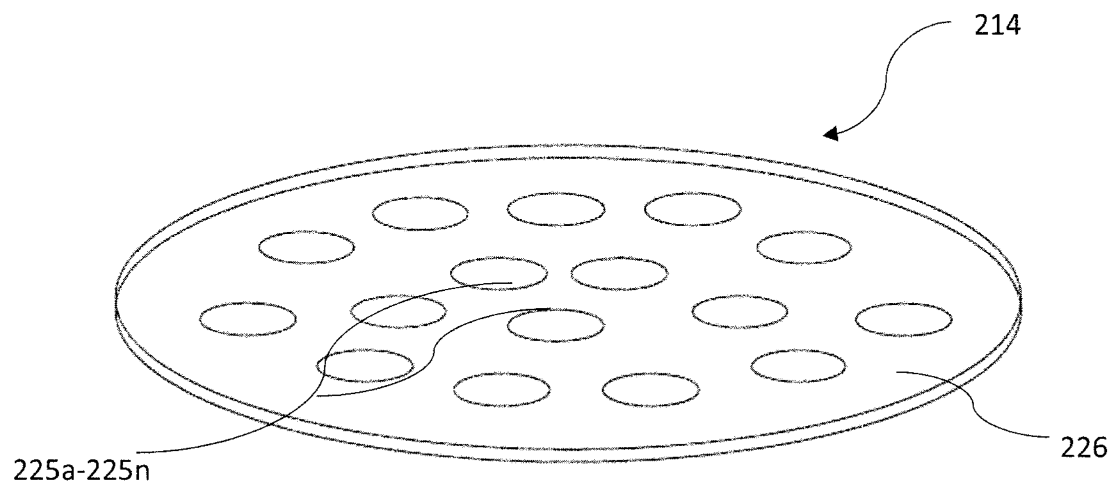
FIG. 4 is a schematic diagram of an embodiment of a disc-shaped insert from the pickling device, according to the present disclosure.

Referring now additionally to FIG. 4, another embodiment of the disc-shaped insert 214 of the pickling device is now described. In this embodiment of the disc-shaped insert 214, those elements already discussed above with respect to FIGS. 1-2 are incremented by 200 and most require no further discussion herein. This embodiment differs from the previous embodiment in that this the disc-shaped insert 214 illustratively omits the post from the embodiment of FIG. 1.

Figure 5:
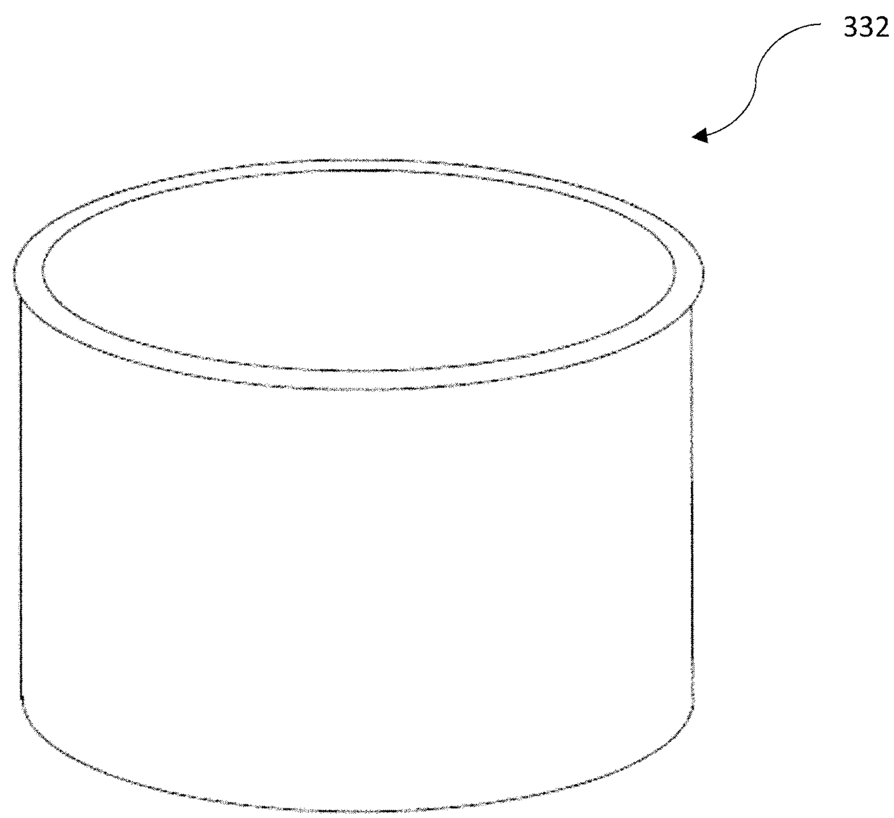
FIG. 5 is a schematic diagram of an embodiment of a liner from the pickling device, according to the present disclosure.

Referring now additionally to FIG. 5, a liner 332 for an embodiment of the pickling device 110 is now described. The liner 332 (comprising, e.g., stainless steel) is to be positioned in the pickling cavity. Helpfully, the liner 332 will shield and protect the interior of the housing from food based degradation. Also, the liner 332 may help with clean-up after the pickling process.

Figure 6:
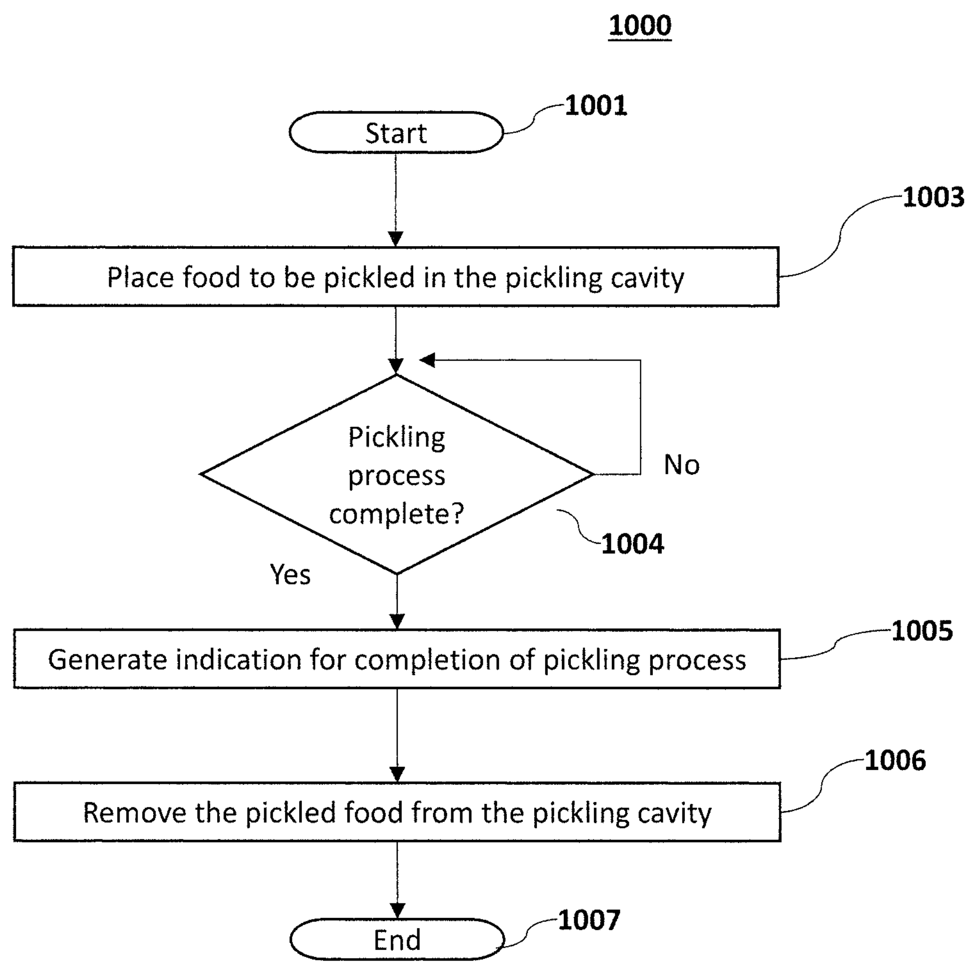
FIG. 6 is a flowchart of a method for operating the pickling device, according to the present disclosure.

Referring now additionally to FIG. 6, another aspect directed to a method for operating the pickling device 10 is described with reference to a flowchart 1000. (Block 1001). The method illustratively comprises placing food to be pickled in the pickling cavity 18. (Block 1003). The method illustratively includes, once the pickling process is complete, generating an indication for completion of the pickling process (Blocks 1004, 1005). The method includes removing the pickled food from the pickling cavity at Block 1006, and ends at Block 1007.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A method for using a pickling device, the method comprising:

positioning food to be pickled in a pickling cavity of a housing, the housing having a first open end and a second closed end opposite the first open end, the pickling cavity extending between the first open end and the second closed end;

positioning a disc-shaped insert completely within the pickling cavity and over the food to be pickled, the disc-shaped insert to weigh down the food to be pickled;

coupling a lid to the first open end of the housing;

coupling a positive pressure source, external to the housing, to the lid; and operating the positive pressure source to pressurize the pickling cavity to exceed a threshold pressure level during a pickling process without application of heat.

2. The method of claim 1 further comprising operating an air valve in the lid to provide selective fluid coupling to the pickling cavity; and wherein the positive pressure source comprises a hand air pump to be removably coupled to the air valve.

3. The method of claim 1 wherein the lid comprises a plurality of tabs at a periphery of the lid; and wherein the housing defines a plurality of recesses at the first open end and to cooperate with the plurality of tabs to couple the lid to the housing.

4. The method of claim 1 wherein the lid comprises a sealing member extending around a periphery of the lid.

5. The method of claim 1 further comprising operating a safety valve in the lid to release pressure in the pickling cavity when a cavity pressure exceeds an upper pressure threshold.

6. The method of claim 1 wherein the disc-shaped insert defines a plurality of openings therein.

7. The method of claim 6 wherein each opening in the plurality of openings is circle-shaped.

8. The method of claim 1 further comprising positioning a liner in the pickling cavity.

9. The method of claim 8 wherein the liner comprises stainless steel.

10. The method of claim 1 further comprising operating the positive pressure source based upon a motorized power source.

11. A method for operating a pickling device comprising a housing having a first open end and a second closed end opposite the first open end, the housing defining a pickling cavity extending between the first open end and the second closed end, the pickling cavity to receive food to be pickled, a disc-shaped insert to be positioned completely within the pickling cavity and over the food to be pickled, the disc-shaped insert to weigh down the food to be pickled, and a lid to be coupled to the first open end of the housing, the method comprising:

operating a positive pressure source, external to the housing and to be removably coupled to the lid, to pressurize the pickling cavity to exceed a threshold pressure level during a pickling process without application of heat.

12. The method of claim 11 further comprising operating an air valve in the lid to provide selective fluid coupling to the pickling cavity; and wherein the positive pressure source comprises a hand air pump to be removably coupled to the air valve.

13. The method of claim 11 wherein the lid comprises a plurality of tabs at a periphery of the lid; and wherein the housing defines a plurality of recesses at the first open end and to cooperate with the plurality of tabs to couple the lid to the housing.

14. The method of claim 11 wherein the lid comprises a sealing member extending around a periphery of the lid.

15. The method of claim 11 further comprising operating a safety valve in the lid to release pressure in the pickling cavity when a cavity pressure exceeds an upper pressure threshold.

16. The method of claim 11 wherein the disc-shaped insert defines a plurality of openings therein.

17. The method of claim 16 wherein each opening in the plurality of openings is circle-shaped.

18. The method of claim 11 further comprising positioning a liner in the pickling cavity.

19. The method of claim 18 wherein the liner comprises stainless steel.

20. A method for using a pickling device, the method comprising:

positioning food to be pickled in a pickling cavity of a housing, the housing having a first open end and a second closed end opposite the first open end, the pickling cavity extending between the first open end and the second closed end;

positioning a disc-shaped insert completely within the pickling cavity and over the food to be pickled, the disc-shaped insert to weigh down the food to be pickled;

coupling a lid to the first open end of the housing;

coupling a positive pressure source to the lid; and operating the positive pressure source to pressurize the pickling cavity to exceed a threshold pressure level during a pickling process without application of heat.

* * * * *